(12) United States Patent
Koga

(10) Patent No.: US 8,603,672 B2
(45) Date of Patent: Dec. 10, 2013

(54) SEMICONDUCTOR-COVERED CATHODE ACTIVE MATERIAL AND LITHIUM SECONDARY BATTERY USING THE SAME

(75) Inventor: Hideyuki Koga, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 626 days.

(21) Appl. No.: 12/673,290

(22) PCT Filed: Jan. 7, 2009

(86) PCT No.: PCT/JP2009/050068
§ 371 (c)(1),
(2), (4) Date: Jan. 24, 2011

(87) PCT Pub. No.: WO2009/088009
PCT Pub. Date: Jul. 16, 2009

(65) Prior Publication Data
US 2011/0111291 A1  May 12, 2011

(30) Foreign Application Priority Data
Jan. 8, 2008  (JP) ................................ 2008-001025

(51) Int. Cl.
*H01M 4/13*   (2010.01)
*H01M 4/04*   (2006.01)
*H01L 21/44*  (2006.01)

(52) U.S. Cl.
USPC .... 429/209; 438/652; 29/623.5; 257/E21.476

(58) Field of Classification Search
USPC ........................ 429/209; 438/652; 29/623.5; 257/E21.476
See application file for complete search history.

(56) References Cited

FOREIGN PATENT DOCUMENTS

| JP | 6-168739 | 6/1994 |
|---|---|---|
| JP | 10-321216 | 12/1998 |
| JP | 2000-100433 | 4/2000 |
| JP | 2003-17053 | 1/2003 |
| JP | 2004-171907 | 6/2004 |
| JP | 2004-311429 | 11/2004 |
| JP | 2005-78800 | 3/2005 |
| JP | 2005-135925 | 5/2005 |
| JP | 2006-216277 | 8/2006 |
| JP | 2007-5267 | 1/2007 |

OTHER PUBLICATIONS

English Machine Translation of JP 06-168739 to Kawakami et al.*
English Machine Translation of JP 2004-311429 to Kawakami et al.*

* cited by examiner

*Primary Examiner* — Carlos Barcena
*Assistant Examiner* — Michael Dignan
(74) *Attorney, Agent, or Firm* — Finnegan, Henderson, Farabow, Garrett & Dunner, LLP

(57) ABSTRACT

A main object of the invention is to provide a cathode active material used to form a lithium secondary battery having the improved cycle characteristics and output. The invention attains the object by providing a semiconductor-covered cathode active material comprising: a cathode active material; and a pn junction semiconductor covering layer which comprises an n-type semiconductor covering layer that covers a surface of the cathode active material and a p-type semiconductor covering layer that covers the surface of the n-type semiconductor covering layer.

5 Claims, 2 Drawing Sheets

SEMICONDUCTOR-COVERED CATHODE ACTIVE MATERIAL AND LITHIUM SECONDARY BATTERY USING THE SAME

CROSS-REFERENCE TO RELATED APPLICATIONS

This application is a national phase application of International Application No. PCT/JP2009/050068, filed Jan. 7, 2009, and claims the priority of Japanese Application No. 2008-001025, filed Jan. 8, 2008, the contents of both of which are incorporated herein by reference.

TECHNICAL FIELD

The present invention relates to a cathode active material used to form a lithium secondary batter, in particular, a lithium secondary battery having the improved cycle characteristics and output.

BACKGROUND ART

As the size of devices such as personal computers, video cameras, and mobile phones has been becoming smaller, lithium secondary batteries have been put into practical use and have been popularized as power sources used in these devices in the fields of information technology-related devices and communication devices since the batteries have a high energy density. In the meantime, in the field of automobiles also, the development of electric vehicles has been hastened from the viewpoint of environmental problems and resource problems. As power sources of the electric vehicles also, lithium secondary batteries have been investigated.

However, a high-capacity lithium secondary battery with metallic lithium used as an anode or the like has not been put into practical use although attention has been paid thereto as a secondary battery exhibiting a high energy density. In other words, the following problem has remained: the surface of its metallic lithium foil piece is not smooth so that the surface has spots where an electric field is concentrated; this causes the lithium metal to grow into a dendrite form by charging and discharging the battery repeatedly; and thus an internal short circuit is caused between the anode and the cathode so that the cycle characteristics decline.

In lithium secondary batteries commercially available at present, an organic liquid electrolyte, in which an organic solvent is used as a solution medium, is used. In such a lithium secondary battery, its cathode active material and its liquid electrolyte contact each other to react with each other. Thus, when the battery is repeatedly charged and discharged, the cathode active material and the liquid electrolyte are deteriorated so that the charging and discharging electricity quantities are decreased. As a result, there arises a problem that the cycle characteristics decline.

In order to improve the durability and the cycle characteristics of such lithium secondary batteries, for example, Patent Document 1 discloses a secondary battery wherein at least a surface of a cathode that is opposite to an anode is covered with one or more thin films each selected from an insulator which ions related to the battery reaction can permeate, a semiconductor, and such an insulator and a semiconductor. This is a battery wherein the cathode surface is covered with the thin film(s) of the electron-nonconductive insulator, which ions related to the battery reaction can permeate, or with the semiconductor, thereby preventing short circuit between the anode and the cathode inside the battery at the time of the generation of dendrites in the anode, so as to improve the cycle characteristics. However, according to Patent Document 1, the surface is covered with the thin film(s) of the electron-nonconductive insulator; therefore, the shift of electrons becomes difficult and others are caused, so as to cause a problem that the output characteristics of the lithium secondary battery decline.

Patent Document 1: Japanese Patent Application Laid-Open (JP-A) No. Hei 6-168739
Patent Document 2: JP-A No. 2006-216277
Patent Document 3: JP-A No. Hei 10-321216

DISCLOSURE OF THE INVENTION

Problem to be Solved by the Invention

In light of the above-mentioned problems, the invention has been made, and a main object thereof is to provide a cathode active material used to form a lithium secondary battery having the improved cycle characteristics and output.

Means for Solving the Problem

In order to attain the object, the invention provides a semiconductor-covered cathode active material, comprising: a cathode active material; and a pn junction semiconductor covering layer which comprises an n-type semiconductor covering layer that covers a surface of the cathode active material and a p-type semiconductor covering layer that covers a surface of the n-type semiconductor covering layer.

According to the invention, the semiconductor-covered cathode active material has the pn junction semiconductor covering layer, thereby restraining a deterioration based on reaction resulting from the contact of the cathode active material with a liquid electrolyte. Thus, the cycle characteristics can be improved. Furthermore, it becomes possible to shift electrons from the side of the cathode active material to the side of the liquid electrolyte in the pn junction semiconductor covering layer, so that the output characteristics can be improved.

In the invention, it is preferred that the surface of the cathode active material is partially covered with the pn junction semiconductor covering layer. When the cathode active material surface has an area uncovered with the pn junction semiconductor covering layer, lithium ions and electrons can be shifted in the uncovered area so that the output characteristics can be further improved. In short, the semiconductor-covered cathode active material can be rendered a semiconductor-covered cathode active material excellent in balance between the cycle characteristics and the output characteristics.

The invention also provides a lithium secondary battery using the above-mentioned semiconductor-covered cathode active material.

According to the invention, by use of a semiconductor-covered cathode active material as described above which can improve the cycle characteristics and the output characteristics, it is possible to obtain a lithium secondary battery having the improved cycle characteristics and the output characteristics.

The invention provides a method for producing a semiconductor-covered cathode active material, comprising the steps of: an n-type semiconductor covering layer forming step for covering a surface of a cathode active material with an n-type semiconductor material to yield an n-type semiconductor covering layer; a pn junction semiconductor covering layer precursor forming step for covering a surface of the n-type semiconductor covering layer with a p-type semiconductor material to form a p-type semiconductor covering layer and to yield a pn junction semiconductor covering layer precursor; and a semiconductor-covered cathode active material forming step of subjecting the pn junction semiconductor covering layer precursor to thermal treatment to form a pn junction semiconductor covering layer and to yield a semiconductor-covered cathode active material.

According to the invention, the semiconductor-covered cathode active material forming step makes it possible to form a pn junction between the n-type semiconductor covering layer and the p-type semiconductor covering layer. This makes it difficult for electrons which pass in the pn junction semiconductor covering layer to shift from a liquid electrolyte to the cathode active material at the time of charging reaction with the very high potential. Thus, a deterioration of the liquid electrolyte and so on can be restrained at the time of the charging reaction.

On the other hand, at the time of discharging reaction with the low potential as described above, the deterioration as described above is restrained. Furthermore, electrons which pass in the pn junction semiconductor covering layer are easily shifted from the cathode active material to the liquid electrolyte. Thus, in the covered area of the cathode active material surface also, the electron conductivity is improved at the time of the discharging reaction, so that the output can be improved.

Accordingly, the method makes it possible to yield a semiconductor-covered cathode active material having the improved cycle characteristics and output.

Effect of the Invention

The invention produces an advantageous effect of making it possible to yield a semiconductor-covered cathode active material having the improved cycle characteristics and output.

Figure 1:
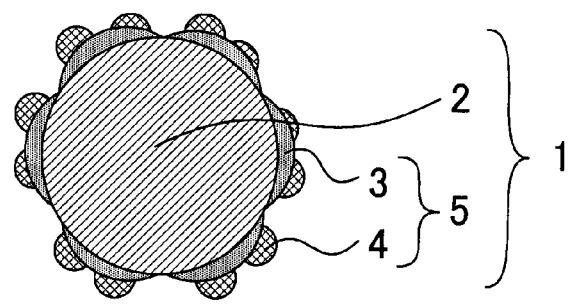
FIG. 1 is a schematic sectional view illustrating an example of the structure of the semiconductor-covered cathode active material of the invention.

DESCRIPTION OF REFERENCE NUMERALS 1 semiconductor-covered cathode active material
2 cathode active material
3 n-type semiconductor covering layer
4 p-type semiconductor covering layer
5 pn junction semiconductor covering layer
6 cathode current collector
7 cathode layer
8 cathode electrode body
9 anode current collector
10 anode layer
11 anode electrode body
12 separator

BEST MODE FOR CARRYING OUT THE INVENTION

Hereinafter, a detailed description will be made about the semiconductor-covered cathode active material of the invention, the lithium secondary battery thereof, and a method thereof for producing a semiconductor-covered cathode active material.

A. Semiconductor-Covered Cathode Active Material

First, the semiconductor-covered cathode active material of the invention is described. The semiconductor-covered cathode active material of the invention comprises: a cathode active material; and a pn junction semiconductor covering layer which comprises an n-type semiconductor covering layer that covers a surface of the cathode active material and a p-type semiconductor covering layer that covers a surface of the n-type semiconductor covering layer.

According to the invention, the semiconductor-covered cathode active material has the pn junction semiconductor covering layer, thereby restraining a deterioration based on reaction resulting from the contact of the cathode active material with a liquid electrolyte. Specifically, in a cathode active material having lithium, lithium ions are usually desorbed from the cathode active material to the liquid electrolyte at the time of charging reaction so that electrons are shifted from the liquid electrolyte to the cathode active material. Since the potential at the time of the charging reaction is very high, a decomposition of the liquid electrolyte and other deteriorations are unfavorably caused. In the invention, the semiconductor-covered cathode active material has the pn junction semiconductor covering layer; in the pn junction semiconductor covering layer, electrons cannot be shifted from the p-type semiconductor covering layer to the n-type semiconductor covering layer. For this reason, it is made difficult for electrons which pass in the pn junction semiconductor covering layer to shift from a liquid electrolyte to the cathode active material at the time of charging reaction. Thus, a deterioration of the liquid electrolyte and so on can be restrained at the time of the charging reaction.

Furthermore, the semiconductor-covered cathode active material has the pn junction semiconductor covering layer, thereby making it possible to shift electrons in the pn junction semiconductor covering layer from the side of the cathode active material to the side of the liquid electrolyte, so that the output characteristics can be improved. Specifically, in a cathode active material having lithium, at the time of discharging reaction, electrons are usually shifted from the cathode active material to the liquid electrolyte, and lithium ions are inserted from the liquid electrolyte to the cathode active material. In the invention, the semiconductor-covered cathode active material has the pn junction semiconductor covering layer; in the pn junction semiconductor covering layer, it becomes possible for electrons to shift from the n-type semiconductor covering layer to the p-type semiconductor covering layer. For this reason, it is made easy for electrons which pass in the pn junction semiconductor covering layer to shift from the cathode active material to the liquid electrolyte at the time of discharging reaction. Thus, in the covered area of the cathode active material surface also, the electron conductivity is improved at the time of the discharging reaction, so that the output can be improved.

At the time of the discharging reaction, the potential is low; thus, a decomposition of the liquid electrolyte and other deteriorations are not easily caused.

Hereinafter, the semiconductor-covered cathode active material of the invention will be described with reference to the drawings.

FIG. 1 is a schematic sectional view which schematically illustrates an example of the semiconductor-covered cathode active material of the invention. A semiconductor-covered cathode active material 1 illustrated in FIG. 1 comprises: a cathode active material 2, and a pn junction semiconductor covering layer 5 composed of an n-type semiconductor covering layer 3 that covers the surface of the cathode active material 2 and a p-type semiconductor covering layer 4 that covers the surface of the n-type semiconductor covering layer 3.

In the semiconductor-covered cathode active material, the cathode active material surface may have an area uncovered with the n-type semiconductor covering layer, and the p-type semiconductor covering layer may be formed on the cathode active material surface in this area.

Hereinafter, the semiconductor-covered cathode active material of the invention will be described by its constituents.

1. pn Junction Semiconductor Covering Layer

First, the pn junction semiconductor covering layer used in the invention is described. The pn junction semiconductor covering layer used in the invention is a layer covering the surface of the cathode active material 2 as illustrated in FIG. 1 referred to above.

Figure 2A:
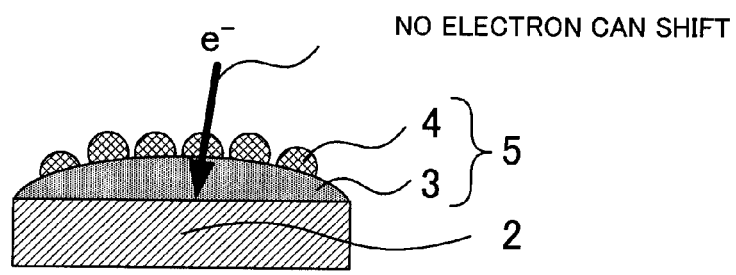
FIGS. 2A and 2B are an explanatory view describing the shift of electrons in a pn junction semiconductor covering layer in the invention.

In the invention, as schematically illustrated in FIG. 2A, in the pn junction semiconductor covering layer 5, which is composed of the n-type semiconductor covering layer 3 covering the surface of the cathode active material 2 and the p-type semiconductor covering layer 4 covering the surface of the n-type semiconductor covering layer 3, usually, any electron (e$^-$ cannot shift (shift into an arrow direction in FIG. 2A) from the p-type semiconductor covering layer 4 to the n-type semiconductor covering layer 3. As described above, therefore, it is made difficult for electron (e$^-$) that passes in the pn junction semiconductor covering layer 5 to shift from a liquid electrolyte (not illustrated) to the cathode active material 2 at the time of charging reaction. Thus, at the time of the charging reaction, a deterioration of the liquid electrolyte and so on can be restrained.

Figure 2B:
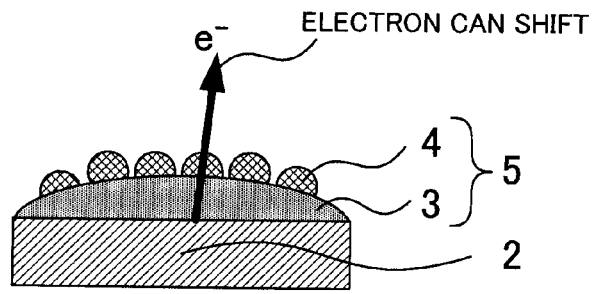

Furthermore, as schematically illustrated in FIG. 2B, in the pn junction semiconductor covering layer 5, which is composed of the n-type semiconductor covering layer 3 covering the surface of the cathode active material 2 and the p-type semiconductor covering layer 4 covering the surface of the n-type semiconductor covering layer 3, electron (e$^-$) can shift (shift into an arrow direction in FIG. 2B) from the n-type semiconductor covering layer 3 to the p-type semiconductor covering layer 4. As described above, therefore, it is made easy for electron (e$^-$) that passes in the pn junction semiconductor covering layer 5 to shift from the cathode active material 2 to the liquid electrolyte (not illustrated) at the time of discharging reaction. Thus, in the covered area of the surface of the cathode active material 2 also, the electron conductivity is improved at the time of the discharging reaction. As a result, the output can be improved.

The n-type semiconductor material used in the n-type semiconductor covering layer is not particularly limited as far as the material has characteristics for an n-type semiconductor and making it possible to form a pn junction semiconductor covering layer as described above, thereby restraining a deterioration of the liquid electrolytic and so on at the time of charging reaction, and further improve the electron conductivity at the time of discharging time to improve the output.

Examples of the n-type semiconductor material include Si (silicon) doped with P (phosphorus), Si (silicon) doped with As (arsenic), and Si (silicon) doped with Sb (antimony). Of these examples, Si (silicon) doped with P (phosphorus) is preferred since a load onto the environment is low.

The p-type semiconductor material used in the p-type semiconductor covering layer is not particularly limited as far as the material has characteristics for a p-type semiconductor and making it possible to form a pn junction semiconductor covering layer as described above, thereby restraining a deterioration of the liquid electrolytic and so on at the time of charging reaction, and further improves the electron conductivity at the time of discharging time to improve the output.

Examples of the p-type semiconductor material include Si (silicon) doped with B (boron), Si (silicon) doped with Al (aluminum), and Si (silicon) doped with Ga (gallium). Of these examples, Si (silicon) doped with B (boron) is preferred.

The cover amount of the pn junction semiconductor covering layer covering the cathode active material surface is not particularly limited as far as the amount is of a degree making it possible to obtain a semiconductor-covered cathode active material having the improved cycle characteristics and the output characteristics, as described above. Preferably, the cathode active material surface is partially covered with the pn junction semiconductor covering layer. In the case, where the cathode active material surface has an area uncovered with the pn junction semiconductor covering layer, the shift of lithium ions and that of electrons can be attained in the uncovered area so that the output characteristics can be made better. In short, the case makes it possible to obtain a semiconductor-covered cathode active material having a good balance between the cycle characteristics and the output characteristics.

The cover amount of the n-type semiconductor material that makes it possible to give such a semiconductor-covered cathode active material having a good balance between the cycle characteristics and the output characteristics, is varied in accordance with factors such as the average particle diameter of the cathode active material and the addition amount of the n-type semiconductor material. The amount is not particularly limited as far as the amount is an amount which permits the cathode active material surface to be partially covered therewith.

Specifically, the percentage by mass of the addition amount of the n-type semiconductor material to that of the cathode active material is preferably 20% or less by mass, more preferably from 0.1 to 10% by mass, and in particular preferably from 1 to 6% by mass.

In the invention, it can be checked with an electron microscope whether or not the n-type semiconductor covering layer covers the cathode active material.

The cover amount of the p-type semiconductor material that makes it possible to give such a semiconductor-covered cathode active material having a good balance between the cycle characteristics and the output characteristics, is varied in accordance with factors such as the average particle diameter of the cathode active material and the addition amount of the n-type semiconductor material. The amount is not particularly limited as far as the n-type semiconductor covering layer surface is covered therewith and it makes possible to give the above-mentioned semiconductor-covered cathode active material having a good balance between the cycle characteristics and the output characteristics.

The percentage by mass of the addition amount of the p-type semiconductor material to that of the n-type semiconductor material is preferably 100% or less by mass, more preferably from 10 to 80% by mass, and in particular preferably from 20 to 70% by mass. When the percentage is in the range, a desired pn junction semiconductor covering layer form, an example of which is as illustrated in FIG. 1, can be obtained effectively, the form being such that the p-type semiconductor covering layer covers at least the n-type semiconductor covering layer surface.

In the invention, it can be checked with an electron microscope whether or not the pn junction semiconductor covering layer covers the cathode active material.

2. Cathode Active Material

Next, the cathode active material used in the invention is described. As illustrated in FIG. 1, the cathode active material 2 used in the invention is characterized in that the cathode active material 2 surface is covered with the pn junction semiconductor covering layer 5.

The cathode active material is not particularly limited as far as the material is a cathode active material capable of adsorbing and releasing lithium ions. Examples thereof include Li-containing metal oxides, metal phosphides which contain Li and oxygen, and metal borides which contain Li and oxygen. Of these examples, Li-containing metal oxides are preferred. The cathode active material is in particular preferably a cathode active material represented by a general formula $Li_xMO_y$, in which M is made mainly of a transition metal, and contains at least one of Co, Mn, Ni, V and Fe, and the ranges of values of "x" and "y" are as follows: x=0.02 to 2.2, and y=1.4 to 3. The cathode active material is usual and excellent in multiusability, and makes it possible to give, with a higher certainty, the desired semiconductor-covered cathode active material having the improved cycle characteristics and the output characteristics.

The form of the cathode active material is not particularly limited as far as the form is a form that permits the material to be covered with the pn junction semiconductor covering layer. The form is usually a fine particle form. The fine particle form is preferably, for example, a spherical form or an elliptic spherical form. When the cathode active material is in a fine particle form, the average particle diameter thereof preferably ranges, for example, from 10 nm to 10 μm.

In the invention, about the form and the average particle diameter of the cathode active material, it is allowable to use values measured based on an image analysis using an electron microscope.

3. Others (Production Method)

The method for producing the semiconductor-covered cathode active material of the invention is not particularly limited as far as the method is a method making it possible to give the semiconductor-covered cathode active material having the improved cycle characteristics and the output characteristics. Examples thereof include a method described in "C. Method for producing a semiconductor-covered cathode active material", which will be described later.

(Usage)

The usage of the semiconductor-covered cathode active material of the invention is not particularly limited. The material may be used as, for example, a cathode active material used in a lithium secondary battery. The material is in particular preferably used as a cathode active material used in a lithium secondary battery for any automobile.

B. Lithium Secondary Battery

Next, the lithium secondary battery of the invention is described. The lithium secondary battery of the invention has a semiconductor-covered cathode active material as described in the "A. Semiconductor-covered cathode active material".

According to the invention, by use of the above-mentioned semiconductor-covered cathode active material which can improve the cycle characteristics and the output characteristics, a lithium secondary battery which can improve cycle characteristics and can restrain a fall in the output characteristics can be obtained.

Figure 3:
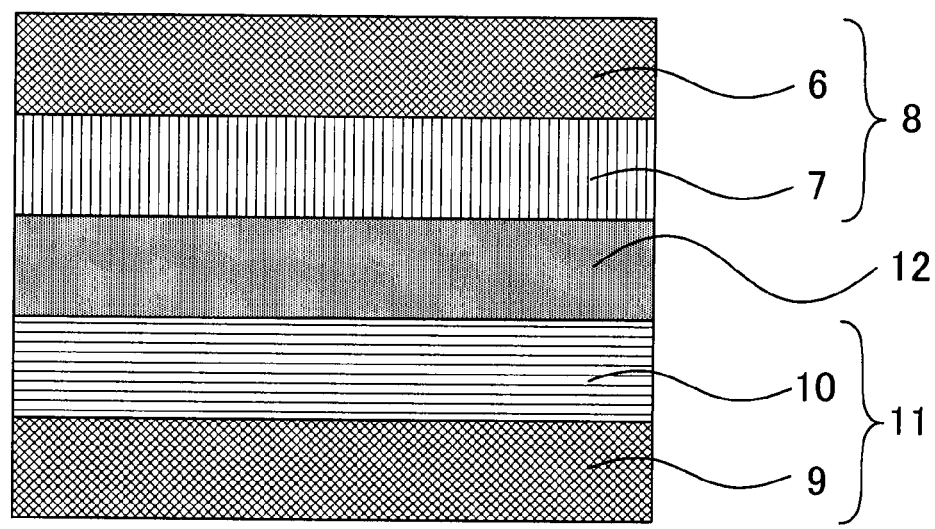
FIG. 3 is a schematic sectional view which schematically illustrates an example of the lithium secondary battery of the invention.

Next, the lithium secondary battery of the invention is described with reference to the drawings. FIG. 3 is a schematic sectional view which schematically illustrates an example of a power-generating element for a lithium secondary battery used in the invention. The lithium secondary battery power-generating element illustrated in FIG. 3 is an element comprising: a cathode electrode body 8 composed of a cathode current collector 6 and a cathode layer 7 containing the semiconductor-covered cathode active material (not illustrated); an anode electrode body 11 composed of an anode current collector 9 and an anode layer 10 containing an anode active material (not illustrated); a separator 12 arranged between the cathode electrode body 8 and the anode electrode body 11; and an electrolyte (not illustrated) containing a lithium salt filled into the cathode layer 7, the anode layer 10, and the separator 12. Usually, the lithium secondary battery power-generating element is inserted into a battery case or the like, and then the periphery thereof is sealed, whereby a lithium secondary battery can be yielded.

Hereinafter, the lithium secondary battery of the invention will be described by its constituents.

1. Cathode Electrode Body

The cathode electrode body used in the invention is described. The cathode electrode body used in the invention is a body composed of at least a cathode current collector, a cathode layer containing the above-mentioned semiconductor-covered cathode active material, and an electrolyte.

The semiconductor-covered cathode active material is the same as described in the "A. Semiconductor-covered cathode active material". Thus, description thereof is omitted herein.

The cathode layer usually contains a conductive material, and a binder. Examples of the conductive material include carbon black, and acetylene black. The binder is not particularly limited as far as the binder is a binder usable in general lithium secondary batteries. Specific examples thereof include polyvinylidene fluoride (PVDF), polytetrafluoroethylene (PTFE), ethylene tetrafluoroethylene (ETFE), and other fluorine-contained resins.

The cathode current collector is a member for attaining the current collection of the cathode layer. The material of the cathode current collector is not particularly limited as far as the material is a material having electroconductivity. Examples thereof include aluminum, SUS, nickel, iron, and titanium. Of these examples, aluminum and SUS are preferred. Further, the cathode current collector may be a dense metallic current collector, or a porous metallic current collector.

2. Anode Electrode Body

Next, the anode electrode body used in the invention is described. The anode electrode body used in the invention is a body composed of at least an anode current collector, an anode layer containing an anode active material, and an electrolyte.

The anode active material is not particularly limited as far as the material is capable of adsorbing and releasing lithium ions. Examples thereof include metallic lithium, lithium alloy, metal oxides, metal sulfides, metal nitrides, and carbon based materials such as graphite. Of these examples, graphite is preferred.

The anode layer may optionally contain a conductive material and a binder. About the conductive material and the binder, the same as in the cathode layer may be used.

The anode current collector is a member for attaining the current collection of the anode layer. The material of the anode current collector is not particularly limited as far as the material is a material having electroconductivity. Examples thereof include copper, stainless steel, and nickel. Of these examples, copper is preferred. The anode current collector may be a dense metallic current collector, or a porous metallic current collector.

3. Separator

Next, the separator used in the invention is described. The separator used in the invention is a member arranged between the cathode layer and the anode layer and having a function of holding an electrolyte that will be described later.

The material of the separator is not particularly limited, and examples thereof include polyethylene (PE), polypropylene (PP), polyester, cellulose, polyamide and other resins. Of the examples, polypropylene is preferred. The separator may be a monolayered structure or multilayered structure. Examples of the separator of the multilayered structure include a separator of a bilayered structure of PE/PP, and a separator of a trilayered structure of PP/PE/PP. In the invention, the separator may be a porous film, a nonwoven cloth such as a resin nonwoven cloth or glass fiber nonwoven cloth.

4. Electrolyte

The invention usually has an electrolyte containing a lithium salt in the cathode layer, anode layer, and separator.

Specifically, the electrolyte may be in a liquid form or in a gel form, and may be appropriately selected in accordance with a desired kind of the battery. The electrolyte is in particular preferably in a liquid form since the lithium ion conductivity becomes better.

When the electrolyte is in a liquid form, the electrolyte is preferably a nonaqueous liquid electrolyte since the lithium ion conductivity becomes better. The nonaqueous liquid electrolyte usually has a lithium salt and a nonaqueous solvent. The lithium salt is not particularly limited as far as the salt is a lithium salt used in an ordinary lithium secondary battery. Examples thereof include $LiPF_6$, $LiBF_4$, $LiN(CF_3SO_2)_2$, $LiCF_3SO_3$, $LiC_4F_9SO_3$, $LiC(CF_3SO_2)_3$, and $LiClO_4$. The nonaqueous solvent is not particularly limited as far as the solvent is a nonaqueous solvent in which the lithium salt can be dissolved. Examples thereof include propylene carbonate, ethylene carbonate, diethyl carbonate, dimethyl carbonate, ethyl methyl carbonate, 1,2-dimethoxyethane, 1,2-diethoxyethane, acetonitrile, propionitrile, tetrahydrofuran, 2-methyltetrahydrofuran, dioxane, 1,3-dioxolane, nitromethane, N,N-dimethylformamide, dimethylsulfoxide, sulfolane, and γ-butyrolactone. In the invention, these nonaqueous solvents may be used alone or in a form of a mixture of two or more thereof. The nonaqueous liquid electrolyte may be an ambient temperature molten salt.

5. Others

The lithium secondary battery of the invention is usually formed by inserting a power-generating element for a lithium secondary battery as illustrated in FIG. 3 into a battery case and then sealing the periphery thereof. The battery case may be generally a case made of a metal, and is, for example, a case made of stainless steel. The form of the battery case used in the invention is not particularly limited as far as the form permits the case to hold members such as the separator, the cathode layer, and the anode layer. Specific examples thereof include a cylindrical form, a rectangular column form, a coin form, and a laminate form.

The method for producing the lithium secondary battery of the invention is not particularly limited as far as the method can give the above-mentioned desired lithium secondary battery having the improved cycle characteristics and output characteristics. The method may be the same method as ordinarily used. The method is, for example, as follows: a slurry having the semiconductor-covered cathode active material is painted onto a metal foil piece to form a cathode layer. In this way, a cathode electrode body is obtained. Next, a slurry having an anode active material is painted onto another metal foil piece to form an anode layer. In this way, an anode electrode body is obtained.

Thereafter, the cathode electrode body and the anode electrode body are set onto a predetermined separator to sandwich the separator between the cathode layer and the anode layer. Furthermore, a predetermined electrolyte is filled into the cathode layer, the anode layer, and the separator, and then the separator sandwiched between the cathode electrode body and the anode electrode body is inserted into a battery case or the like to produce a battery. Thus, the above-mentioned desired lithium secondary battery can be yielded.

The usage of the lithium secondary battery of the invention is not particularly limited. The battery may be used as, for example, a lithium secondary battery for automobiles.

C. Method for Producing a Semiconductor-Covered Cathode Active Material

Next, the method of the invention for producing a semiconductor-covered cathode active material is described in detail hereinafter.

The method of the invention for producing a semiconductor-covered cathode active material comprises the steps of: an n-type semiconductor covering layer forming step for covering a surface of a cathode active material with an n-type semiconductor material to yield an n-type semiconductor covering layer; a pn junction semiconductor covering layer precursor forming step for covering a surface of the n-type semiconductor covering layer with a p-type semiconductor material to form a p-type semiconductor covering layer and to yield a pn junction semiconductor covering layer precursor; and a semiconductor-covered cathode active material forming step of subjecting the pn junction semiconductor covering layer precursor to thermal treatment to form a pn junction semiconductor covering layer and to yield a semiconductor-covered cathode active material.

According to the invention, after an n-type semiconductor covering layer is formed on a cathode active material surface as described above and further a p-type semiconductor covering layer is formed on the surface of the n-type semiconductor covering layer, a pn junction can be formed between the n-type semiconductor covering layer and the p-type semiconductor covering layer. In a cathode active material having lithium, lithium ions are usually desorbed from the cathode active material to the liquid electrolyte at the time of charging reaction so that electrons are shifted from the liquid electrolyte to the cathode active material. Since the potential at the time of the charging reaction is very high, a decomposition of the liquid electrolyte and other deteriorations are unfavorably caused. However, in the pn junction semiconductor covering layer having the pn junction obtained according to the invention, electrons cannot be shifted from the p-type semiconductor covering layer to the n-type semiconductor covering layer. For this reason, it is made difficult for electrons which pass in the pn junction semiconductor covering layer to shift from a liquid electrolyte to the cathode active material at the time of charging reaction. Thus, a deterioration of the liquid electrolyte and so on can be restrained at the time of the charging reaction.

In the meantime, in the pn junction semiconductor covering layer having the pn junction obtained according to the invention, it is made possible for electrons to shift from the n-type semiconductor covering layer to the p-type semiconductor covering layer. In a cathode active material having lithium, at the time of discharging reaction, electrons usually shift from the cathode active material to the liquid electrolyte, and lithium ions are inserted from the liquid electrolyte to the cathode active material. However, the potential at the time of the discharging reaction is low; therefore, a deterioration of the liquid electrolyte, and other deteriorations are not easily caused. For this reason, the deteriorations at the time of the discharging reaction are restrained, and further it is made easy for electrons which pass in the pn junction semiconductor covering layer to shift from the cathode active material to the liquid electrolyte. Thus, in the covered area of the cathode active material surface also, the electron conductivity is improved at the time of the discharging reaction, so that the output can be improved.

Accordingly, a semiconductor-covered cathode active material having the improved cycle characteristics and output from d can be obtained.

In the method of the invention for producing a semiconductor-covered cathode active material, a semiconductor-covered cathode active material can be obtained through steps as specifically described below.

Through the n-type semiconductor covering layer forming step, an n-type semiconductor covering layer is first formed, for example, by mixing a cathode active material with an n-type semiconductor material, with a mechanical application of physical force thereto, using a ball mill or the like, thereby causing the n-type semiconductor material to adhere onto the surface of the cathode active material to form a n-type semiconductor covering layer.

After the n-type semiconductor covering layer forming step, the pn junction semiconductor covering layer precursor forming step is performed. In the pn junction semiconductor covering layer precursor forming step, for example, by mixing the cathode active material, on the surface of which the n-type semiconductor covering layer yielded in the n-type semiconductor covering layer forming steep is formed (hereinafter this cathode active material combined with the covering layer may be referred to merely as the n-type semiconductor-covered cathode active material), with a p-type semiconductor material, with a mechanical application of physical force thereto, using a ball mill or the like, the p-type semiconductor material is caused to adhere onto the surface of the n-type semiconductor-covered cathode active material, thereby yielding a pn junction semiconductor covering layer precursor wherein the p-type semiconductor covering layer is formed on the n-type semiconductor covering layer.

Next, the semiconductor-covered cathode active material forming step is performed. In the semiconductor-covered cathode active material forming step, a pn junction is formed between the n-type semiconductor covering layer and the p-type semiconductor covering layer, for example, by setting, into a firing furnace, the cathode active material, on the surface of which the pn junction semiconductor covering layer yielded in the pn junction semiconductor covering layer precursor forming step is formed (hereinafter this cathode active material combined with the precursor may be referred to merely as the precursor-covered cathode active material), and then subjecting the set work piece to thermal treatment in an inert atmosphere. In this way, a semiconductor-covered cathode active material can be obtained.

The method for producing a semiconductor-covered cathode active material is not particularly limited as far as the method is a production method comprising at least: the n-type semiconductor covering layer forming step for covering a surface of a cathode active material with an n-type semiconductor material to yield an n-type semiconductor covering layer; the pn junction semiconductor covering layer precursor forming step for covering the surface of the n-type semiconductor covering layer with a p-type semiconductor material to form a p-type semiconductor covering layer and to yield a pn junction semiconductor covering layer precursor; and the semiconductor-covered cathode active material forming step for subjecting the pn junction semiconductor covering layer precursor to thermal treatment to form a pn junction semiconductor covering layer and to yield the semiconductor-covered cathode active material. The method may have any other step.

The following will describe, in detail, each of the steps in the method of the invention for producing a semiconductor-covered cathode active material.

1. n-Type Semiconductor Covering Layer Forming Step

First, the n-type semiconductor covering layer forming step in the invention is described. The n-type semiconductor covering layer forming step in the invention is a step of covering a surface of a cathode active material with an n-type semiconductor material to yield an n-type semiconductor covering layer.

Through the present step, an n-type semiconductor covering layer can be formed on a surface of a cathode active material.

The kind of the n-type semiconductor material used in the n-type semiconductor covering layer, the cover amount of the n-type semiconductor material, the cathode active material, and others are the same as described in the item "A. Semiconductor-covered cathode active material". Thus, description thereof is omitted herein.

The form of the n-type semiconductor material used in the present step, which covers the cathode active material surface and is to be the n-type semiconductor covering layer, is not particularly limited as far as the form permits the semiconductor material to adhere onto the cathode active material surface to form the n-type semiconductor covering layer. The form may be, for example, a spherical form or an elliptic spherical form. The average particle diameter of the n-type semiconductor material is not particularly limited as far as the diameter can improve the cycle characteristics and the output when the n-type semiconductor covering layer is formed. The average particle diameter ranges preferably from, e.g., 1 nm to 10 μm, more preferably from 1 nm to 1 μm, and in particular preferably from 10 nm to 1 μm. If the average particle diameter is smaller than the range, the n-type semiconductor covering layer may not be easily formed. If the average particle diameter is larger than the range, the n-type semiconductor covering layer is excessively formed and some other is caused. Thus, sufficient electron conductivity may not be obtained so that the output may not be improved.

In the present step, the average particle diameter of the n-type semiconductor material may be a value measured based on image analysis using an electron microscope.

In the step, the method for covering an n-type semiconductor material onto a cathode active material surface to form an n-type semiconductor covering layer is not particularly limited as far as the method is a method capable of forming the n-type semiconductor covering layer onto the cathode active material surface. The method is, for example, a method of causing the material to adhere thereto by mechanical, physical force using a ball mill, a mortar or the like.

In the case of the use of the ball mill, for example, predetermined balls, the cathode active material and the n-type semiconductor material are added into a given pot, and then ball-milling is performed at a predetermined rotation number for a predetermined time. Conditions for the ball-milling are not particularly limited as far as the conditions permit the cathode active material surface to be covered with the above-mentioned desired amount of the n-type semiconductor material the amount.

Specific examples of the material used for the pot include silicon nitride, zirconia, alumina, and stainless steel. Of the examples, silicon nitride is preferred since the substance is not easily diminished and the incorporation of impurities based on the diminishment is restrained.

Examples of the material used for the balls include silicon nitride, zirconia, alumina, and stainless steel. Of the examples, silicon nitride is preferred since the substance is not easily diminished and the incorporation of impurities based on the diminishment is restrained.

The above-mentioned rotation number ranges preferably from, e.g., 50 to 500 rpm, and more preferably from 100 to 300 rpm.

The time for the ball-milling ranges preferably from, e.g., 1 to 50 hours, and more preferably from 1 to 20 hours. If the time for the ball-milling is too short, the cover amount of the n-type semiconductor material may become insufficient. On the other hand, if the time for the ball-milling is too long, the active material is cracked or some other is caused so that the material may be deteriorated.

2. pn Junction Semiconductor Covering Layer Precursor Forming Step

Next, the pn junction semiconductor covering layer precursor forming step in the invention is described. The pn junction semiconductor covering layer precursor forming step in the invention is a step of covering the surface of the n-type semiconductor covering layer with a p-type semiconductor material to form a p-type semiconductor covering layer and to yield a pn junction semiconductor covering layer precursor.

Through the step, a pn junction semiconductor covering layer precursor can be yielded wherein a p-type semiconductor material is caused to adhere onto the n-type semiconductor covering layer surface to form a p-type semiconductor covering layer on the n-type semiconductor covering layer.

In the pn junction semiconductor covering layer precursor, an area uncovered with the n-type semiconductor covering layer may be present in the surface of the n-type semiconductor-covered cathode active material and the p-type semiconductor covering layer may be formed in this area of the cathode active material surface.

The n-type semiconductor covering layer, the cathode active material and others in the step are the same as described in the item "C. Method for producing a semiconductor-covered cathode active material, 1. n-Type semiconductor covering layer forming step". Thus, description thereof is omitted herein. The kind of the p-type semiconductor material used in the p-type semiconductor covering layer, the cover amount of the p-type semiconductor material, and others are the same as described in the item "A. Semiconductor-covered cathode active material, 1. pn Junction semiconductor covering layer". Thus, description thereof is omitted herein.

The form of the p-type semiconductor material used in the step, which covers the n-type semiconductor covering layer surface and is to be the p-type semiconductor covering layer, is not particularly limited as far as the form permits the p-type semiconductor covering layer to be formed on the n-type semiconductor covering layer surface. The form is, for example, a spherical form or an elliptic spherical form. The average particle diameter of the p-type semiconductor material is not particularly limited as far as the diameter permits the above-mentioned desired p-type semiconductor covering layer to be yielded. The diameter is preferably from, e.g., 1 nm to 10 µm, more preferably from 1 nm to 1 µm, and in particular preferably from 10 nm to 1 µm. If the diameter is smaller than the range, it becomes difficult to form the p-type semiconductor covering layer. Thus, it may become difficult to yield a desired pn junction semiconductor covering layer that will be described later. On the other hand, if the diameter is larger than the range, the p-type semiconductor covering layer is excessively formed and some other is caused so that sufficient electron conductivity is not obtained. Thus, the output may be unable to be improved.

The average particle diameter of the p-type semiconductor material may be a value measured based on image analysis using an electron microscope.

In the step, the method for covering the n-type semiconductor covering layer surface with a p-type semiconductor material to form a p-type semiconductor covering layer, thereby forming a pn junction semiconductor covering layer precursor is not particularly limited as far as the method is a method capable of forming the p-type semiconductor covering layer on the n-type semiconductor covering layer surface. A specific manner thereof is the same as described in the item "C. Method for producing a semiconductor-covered cathode active material, 1. n-Type semiconductor covering layer forming step". Thus, description thereof is omitted herein.

In the case of using a ball mill for a method for yielding the pn junction semiconductor covering layer precursor, specifically, predetermined balls, the n-type semiconductor-covered cathode active material and the p-type semiconductor material are added into a given pot, and then ball-milling is performed at a predetermined rotation number for a predetermined time. Conditions for the ball-milling are not particularly limited as far as the conditions permit the n-type semiconductor covering layer surface to be covered with the above-mentioned desired amount of the p-type semiconductor material.

The material used for the pot, and the material used for the balls are specifically the same as described in the item "C. Method for producing a semiconductor-covered cathode active material, 1. n-Type semiconductor covering layer forming step". Thus, description thereof is omitted herein.

The rotation number is preferably from, e.g., 50 to 500 rpm, and more preferably from 100 to 300 rpm.

The time for the ball-milling is preferably from, e.g., 1 to 50 hours, and more preferably from 1 to 20 hours. If the ball-milling time is too short, the cover amount of the p-type semiconductor material may become insufficient. On the other hand, if the ball-milling time is too long, the active material is cracked or some other is caused so that the material may be deteriorated.

3. Semiconductor-Covered Cathode Active Material Forming Step

Next, the semiconductor-covered cathode active material forming step in the invention is described. The semiconductor-covered cathode active material forming step in the invention is a step of subjecting the pn junction semiconductor covering layer precursor to thermal treatment to form a pn junction semiconductor covering layer and to yield a semiconductor-covered cathode active material.

Through the present step, a pn junction is formed between the n-type semiconductor covering layer and the p-type semiconductor covering layer, thereby making it possible to yield the semiconductor-covered cathode active material having the desired improved cycle characteristics and output.

The pn junction semiconductor covering layer precursor in the step is the same as described in the item "C. Method for producing a semiconductor-covered cathode active material, 2. pn Junction semiconductor covering layer precursor forming step". Thus, description thereof is omitted herein.

In the step, the method for subjecting the pn junction semiconductor covering layer precursor to thermal treatment to form a pn junction semiconductor covering layer and to yield a semiconductor-covered cathode active material is not particularly limited as far as the method is a method capable of forming the pn junction semiconductor covering layer. A specific manner thereof is, for example, a manner of firing the cathode active material having the pn junction semiconductor covering layer precursor (hereinafter this precursor-combined cathode active material may be referred to merely as the precursor cathode active material) in a predetermined atmosphere at a predetermined temperature for a predetermined time.

In the step, the predetermined temperature in the thermal treatment is varied in accordance with factors such as the kind of the cathode active material, that of the n-type semiconductor material in the pn junction semiconductor covering layer, and that of the p-type semiconductor material in the pn junction semiconductor covering layer. The temperature is not particularly limited as far as the temperature is a temperature which permits the pn junction to be formed without deteriorating the cathode active material so as to form the pn junction semiconductor covering layer. The temperature is preferably from, e.g., 200 to 1500° C., more preferably from 400 to 1000° C., and in particular preferably from 600 to 900° C.

In a case where the cathode active material is $LiCoO_2$, the n-type semiconductor material in the pn junction semiconductor covering layer is Si (silicon) powder doped with P (phosphorus), and the p-type semiconductor material is Si(silicon) powder doped with B (boron), the temperature is usually from 200 to 800° C.

In the step, the atmosphere in the thermal treatment is not particularly limited as far as the atmosphere is an atmosphere which permits a pn junction to be formed between the n-type semiconductor covering layer and the p-type semiconductor covering layer to yield the desired semiconductor-covered cathode active material having the improved cycle characteristics and output. Usually, the treatment is preferably conducted in an inert atmosphere. Examples of the inert atmosphere include $N_2$ gas, and Ar gas.

The semiconductor-covered cathode active material yielded in the step is the same as described in the item "A. Semiconductor-covered cathode active material". Thus, description thereof is omitted herein.

The invention is not limited to the above-mentioned embodiments. The above-mentioned embodiments are examples, and any embodiment that has the same structure as the technical conception recited in the claims of the invention has and that produces the same effect and advantages as the invention produces is included in the technical scope of the invention.

EXAMPLES

Hereinafter, the invention will be specifically described by way of examples.

Example (Production of a Semiconductor-Covered Cathode Active Material)

To 9.5 g of a cathode active material, lithium cobaltate ($liCoO_2$), added was 0.3 g of n-type Si powder doped with P, and the components were mixed with each other in a ball mill to yield an n-type Si semiconductor covered lithium cobaltate. In connection with conditions for the ball-milling, silicon nitride was used as the material of the pot, and silicon nitride was used as the material of the balls to conduct the ball-milling at a rotation number of 300 rpm for 3 hours.

Next, to 9.8 g of the n-type Si semiconductor covered lithium cobaltate, added was 0.2 g of p-type Si powder doped with B, and the components were mixed with each other in a ball mill to yield a precursor cathode active material in which a p-type Si semiconductor covering layer was formed on the n-type Si semiconductor covering layer. In connection with conditions for the ball-milling, silicon nitride was used as the material of the pot, and silicon nitride was used as the material of the balls to conduct the ball-milling at a rotation number of 300 rpm for 3 hours.

Thereafter, the precursor cathode active material was subjected to thermal treatment in an inert atmosphere (argon) at 800° C., so as to yield a semiconductor covered lithium cobaltate in which a pn junction was formed.

(Formation of a Cathode Electrode Body)

To a solution in which polyvinylidene fluoride (PVDF) as a binder was dissolved in a solvent, n-methylpyrrolidone, added were the followings: 9.0 g of the semiconductor covered lithium cobaltate powder obtained in the item (Production of a semiconductor-covered cathode active material), in which the pn junction was formed; and 1.0 g of carbon black, which is a conductive material. The components were then kneaded until the components were mixed into a uniform form. In this way, a slurry for cathode layer was produced.

The slurry for cathode layer was painted onto a single surface of an Al current collector, and then the slurry was dried to form a cathode electrode body.

(Formation of an Anode Electrode Body)

Graphite powder, which is an anode active material, was added into water in which polyvinylidene fluoride (PVDF) as a binder was dispersed, and then the components were kneaded until the components were mixed into a uniform form. In this way, a slurry for anode layer was produced.

The slurry for anode layer was painted onto a single surface of a Cu current collector, and then the slurry was dried to form an anode electrode body.

(Production of a Battery)

The cathode electrode body, the anode electrode body and a porous separator made of PP as a separator were used to produce a coin-shaped battery. The liquid electrolyte used therein was a solution in which lithium hexafluorophosphate ($LiPF_6$) as a supporting salt was dissolved in a mixture, in which EC (ethylene carbonate) and DMC (dimethyl carbonate) were mixed with each other at a volume ratio of 3:7, so as to give a concentration of 1 mol/L.

Comparative Example 1

(Production of a Semiconductor-Covered Cathode Active Material)

To 9.5 g of a cathode active material, $LiCoO_2$, added was 0.5 g of n-type Si powder doped with P, and the components were mixed with each other in a ball mill to yield an n-type Si semiconductor covered lithium cobaltate. In connection with conditions for the ball-milling, silicon nitride was used as the material of the pot, and silicon nitride was used as the material of the balls to conduct the ball-milling at a rotation number of 300 rpm for 6 hours.

A coin-shaped battery was yielded in the same way as in Example except that instead of the semiconductor covered lithium cobaltate, in which the pn junction was formed, an n-type Si semiconductor covered lithium cobaltate was used as the cathode active material.

Comparative Example 2

A coin-shaped battery was produced in the same way as in Comparative Example 1 except that at the time of producing the semiconductor-covered cathode active material, 0.5 g of p-type Si powder doped with B was added instead of the addition of 0.5 g of the n-type Si powder doped with P.

Comparative Example 3

A coin-shaped battery was produced in the same way as in Comparative Example 1 except that at the time of producing the semiconductor-covered cathode active material, Si powder was added instead of the addition of the n-type Si powder doped with P.

Evaluation (Measurement of Capacity Retention Percentage, and Measurement of Discharged Capacity)

Each of the coin-shaped batteries yielded in Example, and Comparative Examples 1, 2 and 3 was used to make tests about the capacity retention percentage and the discharged capacity thereof. About the capacity retention percentage, the battery was charged into 4.2 V at 1 C, and discharged into 2.9 V at 1 C. This cycle was repeated 100 times to measure the capacity retention percentage. About the discharged capacity, the battery was charged into 4.2 V at 1 C, and discharged into 2.9 V at 100, so as to measure the discharged capacity. The obtained results are shown in Table 1.

TABLE 1

Capacity Retention Percentage and Discharged Capacity

|  | Capacity retention percentage after 100 cycles (%) | Discharged capacity at 10 C. (mAh/g) |
|---|---|---|
| Example 1 | 82 | 46 |
| Comparative Example 1 | 76 | 45 |
| Comparative Example 2 | 78 | 42 |
| Comparative Example 3 | 80 | 31 |

As shown in Table 1, the capacity retention percentage was 76% in Comparative Example 1, 78% in Comparative Example 2, 80% in Comparative Example 3, and 82% in Example. In Comparative Examples 1 and 2, the capacity retention percentages were somewhat lower than in Comparative Example 3. In Example, a better value was shown in Comparative Examples 1, 2 and 3, and a best capacity retention percentage was shown.

The discharged capacity was 45 mAh/g in Comparative Example 1, 42 mAh/g in Comparative Example 2, 31 mAh/g in Comparative Example 3, and 46 mAh/g in Example. In Comparative Examples 1 and 2, and Example, better discharge capacities were shown in Comparative Example 3. Moreover, the discharged capacity in Example was best.

According to the above-mentioned results, in Comparative Examples 1 and 2, their cathode active material surface was covered with the n-type semiconductor covering layer or the p-type semiconductor covering layer, thereby making it possible to restrain a deterioration based on reaction resulting from contact between the cathode active material and the liquid electrolyte. Thus, a good capacity retention percentage was shown. Furthermore, it was made possible to shift electrons in the n-type semiconductor covering layer or the p-type semiconductor covering layer so as to improve the output characteristics. Thus, a good discharged capacity was shown.

In Example, the battery had the pn junction semiconductor covering layer, whereby electrons could not shift from the p-type semiconductor covering layer to the n-type semiconductor covering layer in the pn junction semiconductor covering layer. For this reason, it was made difficult for electrons which passed in the pn junction semiconductor covering layer to shift from the liquid electrolyte to the cathode active material at the time of charging reaction. Thus, it was made possible to restrain a deterioration of the liquid electrolyte and so on at the time of the charging reaction. As a result, a best capacity retention percentage was shown. Furthermore, in Example, the battery had the pn junction semiconductor covering layer, whereby electrons in the pn junction semiconductor covering layer could shift from the n-type semiconductor covering layer to the p-type semiconductor covering layer. For this reason, it was made easy for electrons which passed in the pn junction semiconductor covering layer to shift from the cathode active material to the liquid electrolyte at the time of discharging reaction. Thus, in the covered area of the cathode active material also, the electron conductivity was improved at the time of the discharging reaction, so that an improvement in the output was made possible. As a result, a best discharged capacity was shown.

The invention claimed is:

1. A semiconductor-covered cathode active material, comprising:
    a cathode active material; and
    a pn junction semiconductor covering layer which comprises an n-type semiconductor covering layer that covers a surface of the cathode active material and a p-type semiconductor covering layer that covers a surface of the n-type semiconductor covering layer.

2. The semiconductor-covered cathode active material according to claim 1, wherein the surface of the cathode active material is partially covered with the pn junction semiconductor covering layer.

3. A lithium secondary battery, comprising the semiconductor-covered cathode active material as recited in claim 1.

4. A lithium secondary battery, comprising the semiconductor-covered cathode active material as recited in claim 2.

5. A method for producing a semiconductor-covered cathode active material, comprising the steps of:
    an n-type semiconductor covering layer forming step for covering a surface of a cathode active material with an n-type semiconductor material to yield an n-type semiconductor covering layer;
    a pn junction semiconductor covering layer precursor forming step for covering a surface of the n-type semiconductor covering layer with a p-type semiconductor material to form a p-type semiconductor covering layer and to yield a pn junction semiconductor covering layer precursor; and
    a semiconductor-covered cathode active material forming step of subjecting the pn junction semiconductor covering layer precursor to thermal treatment to form a pn junction semiconductor covering layer and to yield a semiconductor-covered cathode active material.

* * * * *